United States Patent
Oomen et al.

(10) Patent No.: US 11,690,454 B2
(45) Date of Patent: Jul. 4, 2023

(54) APPARATUS AND METHOD FOR MANUFACTURING A FABRIC SUSPENSION SEAT STRUCTURE

(71) Applicant: ILLINOIS TOOL WORKS INC., Glenview, IL (US)

(72) Inventors: Craig Martin Oomen, Lowell, MI (US); Samuel Smith, Allendale, MI (US); Robert A. Bratty, Stanton, MI (US); Michael Long, Sparta, MI (US); Kelly Washburn, Middleville, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/380,094

(22) Filed: Jul. 20, 2021

(65) Prior Publication Data
US 2022/0039554 A1 Feb. 10, 2022

Related U.S. Application Data

(60) Provisional application No. 63/062,002, filed on Aug. 6, 2020.

(51) Int. Cl.
*A47C 7/28* (2006.01)
*A47C 1/032* (2006.01)
*A47C 7/16* (2006.01)

(52) U.S. Cl.
CPC ............ *A47C 1/03261* (2013.01); *A47C 7/16* (2013.01); *A47C 7/282* (2013.01)

(58) Field of Classification Search
CPC ....................................................... A47C 7/282
See application file for complete search history.

(56) References Cited

U.S. PATENT DOCUMENTS

| | | | | | |
|---|---|---|---|---|---|
| 94,553 | A | * | 9/1869 | Bingham | A47C 31/02 5/403 |
| 662,647 | A | * | 11/1900 | Howe | E06B 7/32 297/452.64 |
| 1,955,187 | A | * | 4/1934 | Howard | A47C 31/02 264/257 |
| 3,088,517 | A | * | 5/1963 | Schwartz | A47C 31/04 297/452.63 X |
| 3,175,269 | A | * | 3/1965 | Raduns | A47C 7/22 297/452.63 X |
| 3,179,469 | A | * | 4/1965 | Heuston | A47C 7/282 297/452.56 X |
| 3,498,668 | A | * | 3/1970 | Vanderminden | A47C 4/283 297/45 |
| 3,844,612 | A | * | 10/1974 | Borggren | A47C 31/04 297/451.3 |
| 6,378,944 | B1 | * | 4/2002 | Weisser | A47C 7/40 297/218.5 X |
| 6,511,562 | B1 | * | 1/2003 | Coffield | A47C 4/30 297/218.5 X |
| 6,540,950 | B1 | * | 4/2003 | Coffield | B29C 45/14336 297/452.64 |

(Continued)

*Primary Examiner* — Rodney B White
(74) *Attorney, Agent, or Firm* — Quarles & Brady LLP

(57) ABSTRACT

A seat assembly includes a fabric component having a seat surface and a frame including an interior segment directly attached to the fabric component. The interior segment extends from an exterior segment that has a greater flexural resistance than the interior segment.

13 Claims, 8 Drawing Sheets

(56) References Cited

U.S. PATENT DOCUMENTS

| | | | | |
|---|---|---|---|---|
| 6,767,066 B1* | 7/2004 | Tornero | ................... | A61G 5/00 |
| | | | | 297/440.11 |
| 7,021,718 B2* | 4/2006 | Coffield | ............... | A47C 31/026 |
| | | | | 297/218.5 X |
| 8,329,281 B2* | 12/2012 | Coffield | ............ | B29C 45/14631 |
| | | | | 428/131 |
| 8,465,007 B2* | 6/2013 | Coffield | ............... | A47C 31/023 |
| | | | | 267/143 |
| 8,616,655 B2* | 12/2013 | Jung | ................... | A47C 31/023 |
| | | | | 297/452.56 |
| 10,874,220 B2* | 12/2020 | Aldrich | ................ | A47C 31/006 |
| 11,134,792 B2* | 10/2021 | Case | ................. | A47C 31/023 |
| 11,452,380 B2* | 9/2022 | Oomen | .................... | A47C 7/40 |
| 2003/0001420 A1* | 1/2003 | Koepke | ................. | A47C 7/282 |
| | | | | 297/440.14 |
| 2003/0080595 A1* | 5/2003 | Wilkerson | ............... | A47C 7/46 |
| | | | | 297/300.2 |
| 2003/0168901 A1* | 9/2003 | Wilkerson | ............. | A47C 31/02 |
| | | | | 297/452.56 |
| 2003/0209935 A1* | 11/2003 | Legal | ................... | A47C 31/023 |
| | | | | 297/452.63 X |
| 2009/0315384 A1* | 12/2009 | Yang | ....................... | A47C 7/282 |
| | | | | 297/452.47 |
| 2009/0317600 A1* | 12/2009 | Lee | ........................ | A47C 7/282 |
| | | | | 428/193 |
| 2020/0039399 A1* | 2/2020 | Oomen | ................ | B60N 2/5891 |
| 2021/0315384 A1* | 10/2021 | Oomen | .................... | B60N 2/72 |
| 2021/0353067 A1* | 11/2021 | Oomen | ................ | A47C 31/023 |

* cited by examiner

APPARATUS AND METHOD FOR MANUFACTURING A FABRIC SUSPENSION SEAT STRUCTURE

RELATED APPLICATION

The present application claims the benefit of U.S. Provisional Application No. 63/062,002, filed on Aug. 6, 2020, which is incorporated herein by reference in its entirety.

BACKGROUND

Field of the Disclosure

Examples of the present disclosure generally relate to a fabric suspension seat structure, and more particularly, to a fabric suspension seat structure having a molded frame.

Description of the Background of Disclosure

Seat assemblies, such as office furniture, often use a fabric suspension structure. Typically, a fabric suspension seat structure includes a support frame disposed along a perimeter of a fabric. The fabric extends across the support frame to provide a surface on which a user can sit. The fabric often secures to a carrier component that is then attached to the support frame. In some examples, the support frame includes a return flange for supporting the fabric surface in a load bearing state, and a channel for receiving the carrier. The carrier is usually overmolded to the stretched fabric. However, the return flange can be expensive and impractical to manufacture. Some fabric suspension seat structures have eliminated the carrier and return flange, but such seat structures may result in increased stress points and, therefore, failure points.

SUMMARY

In one aspect, a seat assembly includes a fabric component having a seat surface and a frame including an interior segment directly attached the fabric component. The interior segment extends from an exterior segment that has a greater flexural resistance than the interior segment.

In some examples, the fabric component can be at least partially surrounded by the frame. The fabric component may be configured to extend across the frame in a tensioned state. Further, the fabric component may be at least partially composed of a resin material. In some examples, the seat assembly includes a skirt that can be configured to be molded to the fabric component and to have a lower flexural resistance. The skirt may be at least partially composed of a material having a melting temperature that is greater than a melting temperature of the material of the fabric component. In addition, the skirt can include a plurality of gaps therealong. Also, a living hinge may be formed between the skirt and the frame.

In another example, a seat assembly includes a seat member, a frame, and a skirt integrally formed with the frame and the seat member. In some aspects, the skirt can extend along at least a portion of a periphery of the seat member. Further, the skirt can be coupled to an inner segment of the frame. Also, the inner segment of the frame has a flexural resistance that may be greater than a flexural resistance of the skirt. A living hinge may be formed between the inner segment of the frame and the skirt. At least a portion of the seat member may be configured to rotate about the inner segment of the frame. In one aspect, the flexural resistance of the skirt decreases in a direction moving inwardly from the living hinge to an interior edge of the skirt. The skirt may include a plurality of undulations therealong. Further, the skirt can decrease in thickness between an interior edge and the frame.

In still another example, a method of manufacturing a seat assembly includes receiving a fabric blank within a first molding block, applying a tension to the fabric blank within the first molding block, and attaching a heat shield to a side of the fabric blank that is exposed to a second molding block. The heat shield may comprise a polyester material. Further, the method can include moving at least one of the first molding block or the second molding block toward the other, injecting a liquid thermoplastic material through a mold cavity in the first molding block to form a frame, removing the first or second molding block from the other, and ejecting a seat assembly. The seat assembly can include the fabric blank and a frame. In addition, the method can include discarding excess fabric from the seat assembly and separating the heat shield from the seat assembly.

In some aspects, the heat shield can be reusable. Further, cooling lines can be formed within the first molding block or the second molding block, or both.

DETAILED DESCRIPTION

Figure 1:
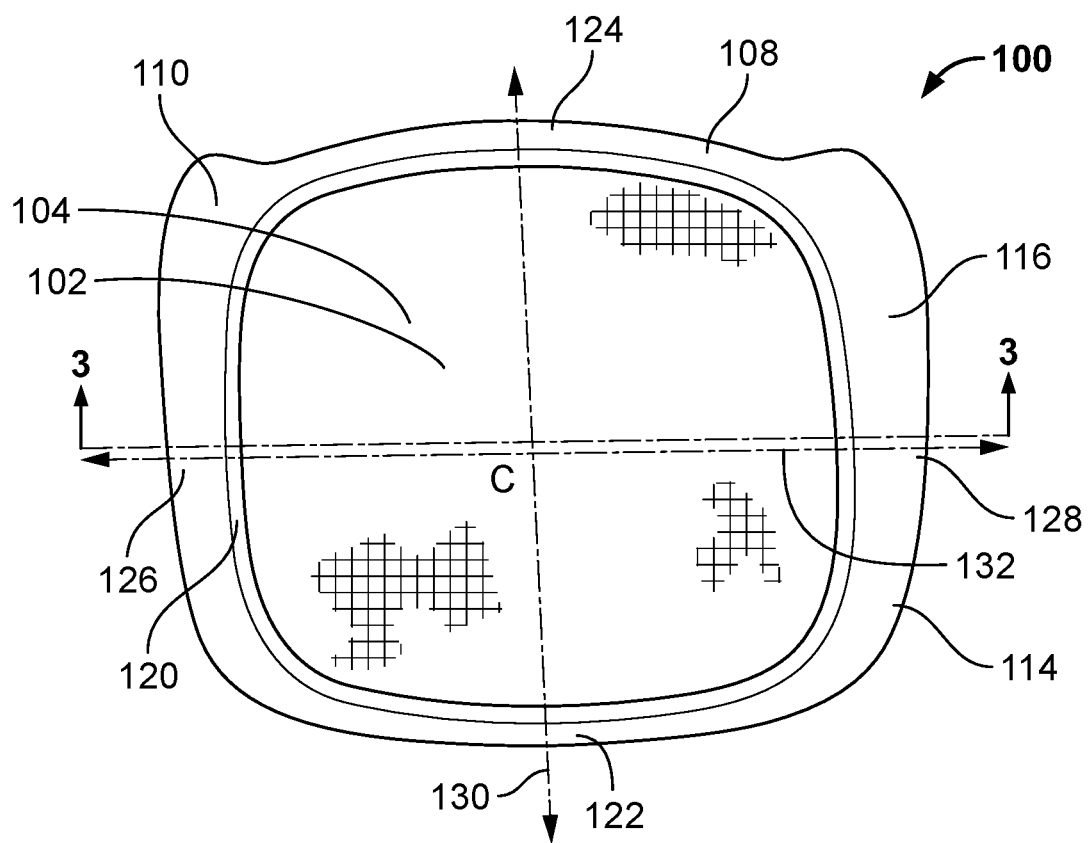
FIG. 1 is a plan view of one example of a seat assembly.

Examples of the present disclosure provide a seat assembly including a fabric and a frame. A flexible inner portion of the frame is configured to be directly molded to a perimeter section of the fabric component. The frame may be integrally formed with the inner portion. In some examples, the inner portion of the frame may include a groove, a fold, or a reduced thickness therealong. In this manner, the seat assembly may distribute stress during loading of the fabric component.

With reference to FIGS. 1-5, in one aspect, a seat assembly 100 is shown that comprises a fabric component 102, or seat member. The fabric component 102 has a top surface 104 opposite a bottom surface 106 and extends across a frame 108, or frame member, such that the fabric component 102 is stretched or tensioned to provide the top surface 104, or a seat surface, in a suspended state and capable of supporting a user in a seated position.

Figure 2:
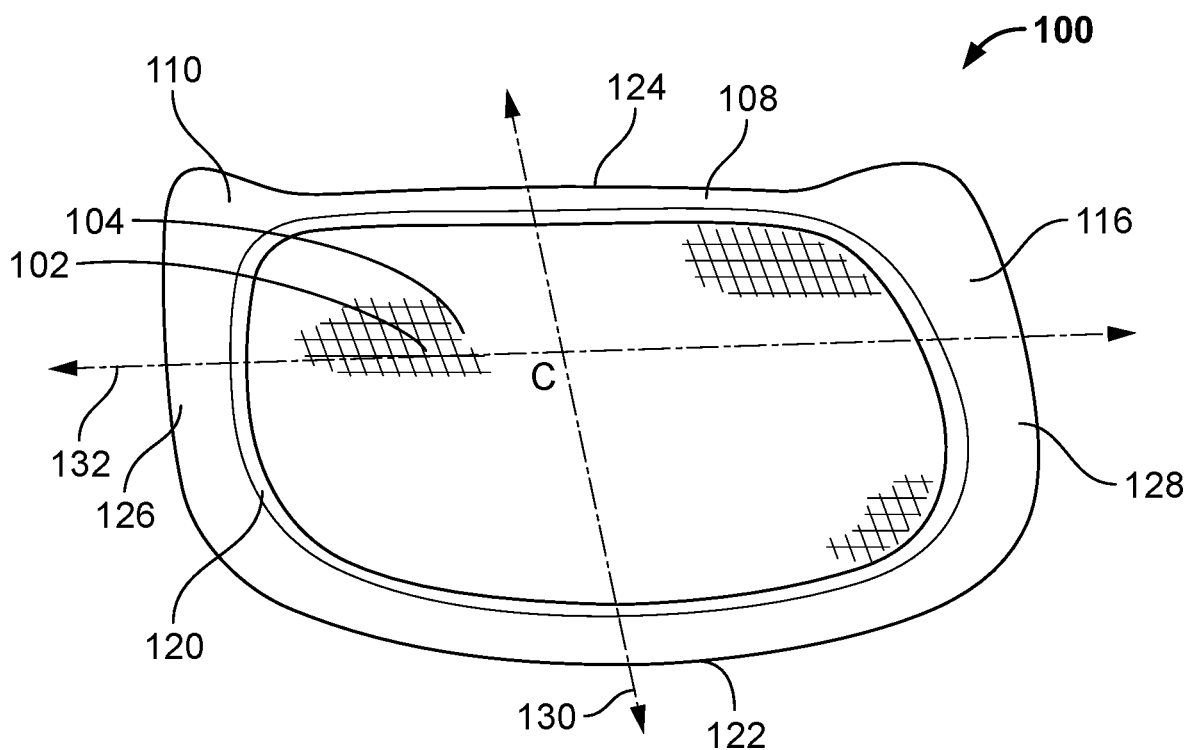
FIG. 2 is an isometric view of front, top, left and right side of the seat assembly of FIG. 1.

As depicted in FIGS. 1 and 2, the fabric component 102 is comprised of a plurality of fibers that are woven or arranged together, with all or some of the fibers being formed of a flexible material or resin. For example, the fabric component 102 may comprise a knitted component, a woven textile, a non-woven textile, leather, mesh, suede, and/or a combination of one or more of the aforementioned materials. The fabric component 102 may be formed by way of warp knitting, weft knitting, flat knitting, circular knitting, and/or other suitable knitting operations. The fabric component 102 may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double-cloth weaves, for example. Non-woven textiles include textiles made by air-laid and/or spun-laid methods, for example. The fabric component 102 may comprise a variety of materials that may have varying properties or visual characteristics. For example, some or all of the fibers of the fabric component 102 may be formed of a fiberglass or a thermoplastic material or resin, or a combination thereof. The plurality of fibers may be bonded or fastened together and oriented lengthwise with respect to one another and along a fore-to-aft length of the frame 108 or a side-to-side length of the frame 108. The melting temperature of the fabric component 102 depends at least in part on the selection or combination of material or resin of the plurality of fibers, which may be configured to have a low average melting temperature relative to the average melting temperature of the material of the frame 108.

With continued reference to FIGS. 1-5, the frame 108 comprises an upper surface 110, a lower surface 112, and a peripheral edge 114 disposed between the upper surface 110 and the lower surface 112. The peripheral edge 114 is also disposed adjacent to a mid-segment 116 that varies in thickness and shape along the frame 108. A lower protrusion 118 (see FIG. 3) extends from a portion of the mid-segment 116 that is on the lower surface 112. An inner segment 120 is disposed inwardly from the mid-segment 116 and, more specifically, between the fabric component 102 and the mid-segment 116. The frame 108 may be integrally formed of a material or resin or a combination thereof that can comprise a resilient polymer such as any thermoplastic. For example, the thermoplastic can include nylon, glass-filled nylon, polypropylene, acetyl, or polycarbonate; any thermal set material, including epoxies; or any resin-based composites, including carbon fiber or fiberglass, thereby allowing the frame 108 to conform and move in response to force exerted by a user. The frame 108 may be formed from a wide variety of polymeric materials, including, for example, polyethylene (PE), low density polyethylene (LDPE), high density polyethylene (HDPE), polyethylene terephthalate (PET), crystalline PET, amorphous PET, polyethylene glycol terephthalate, polystyrene (PS), polyamide (PA), polyvinyl chloride (PVC), polycarbonate (PC), poly(styrene:acrylonitrile) (SAN), polymethylmethacrylate (PMMA), polypropylene (PP), polyethylene naphthalene (PEN), polyethylene furanoate (PEF), PET homopolymers, PEN copolymers, PET/PEN resin blends, PEN homopolymers, over-molded thermoplastic elastomers (TPE), fluropolymers, polysulphones, polyimides, cellulose acetate, and/or combinations thereof.

Referring to FIGS. 1 and 2, the frame 108 includes a front end 122, a rear end 124, a left end 126, and a right end 128. A longitudinal axis 130 extends from a front end 122 to a rear end 124 and further defines a vertical plane that bisects the seat assembly 100 and a horizontal plane that is coplanar with the top surface 104 of the fabric component 102. A transverse axis 132 extends coplanar with and perpendicular to the longitudinal axis 130 from a left end 126 to a right end 128 of the frame 108, and further defines a vertical plane that bisects the seat assembly 100. As such, an intersection between the longitudinal axis 130 and the transverse axis 132 defines a central point C of the seat assembly 100.

As depicted in FIGS. 1 and 2, the frame 108 is symmetrical about the longitudinal axis 130, such that the shape and size of the frame 108 at the right end 128 is mirrored by the shape and size of the frame 108 at the left end 126. The shape and size of the frame 108 at the front end 122 is different from the shape and size of the frame 108 at the rear end 124, such that the frame 108 is asymmetrical about the transverse axis 132. Between the left end 126 and the rear end 124, the frame 108 extends outwardly and vertically upward to form a first lateral stabilizer 134. Between the right end 128 and the rear end 124, the frame 108 extends outwardly and vertically upward to form a second lateral stabilizer 136. The curvature of the first lateral stabilizer 134 resembles a wing, such that the mid-segment 116 extends from the inner segment 120 so that the peripheral edge 114 is gradually distanced above the horizontal plane of the longitudinal axis 130 and outwardly from the vertical plane of the longitudinal axis 130 before curving inward and downward to the rear end 124 of the frame 108. Similarly, the curvature of the second lateral stabilizer 136 resembles a wing, such that the mid-segment 116 extends from the inner segment 120 so that the peripheral edge 114 is gradually distanced above the horizontal plane of the longitudinal axis 130 and outwardly from the vertical plane of the longitudinal axis 130 before curving inward and downward to the rear end 124 of the frame 108.

Figure 3:
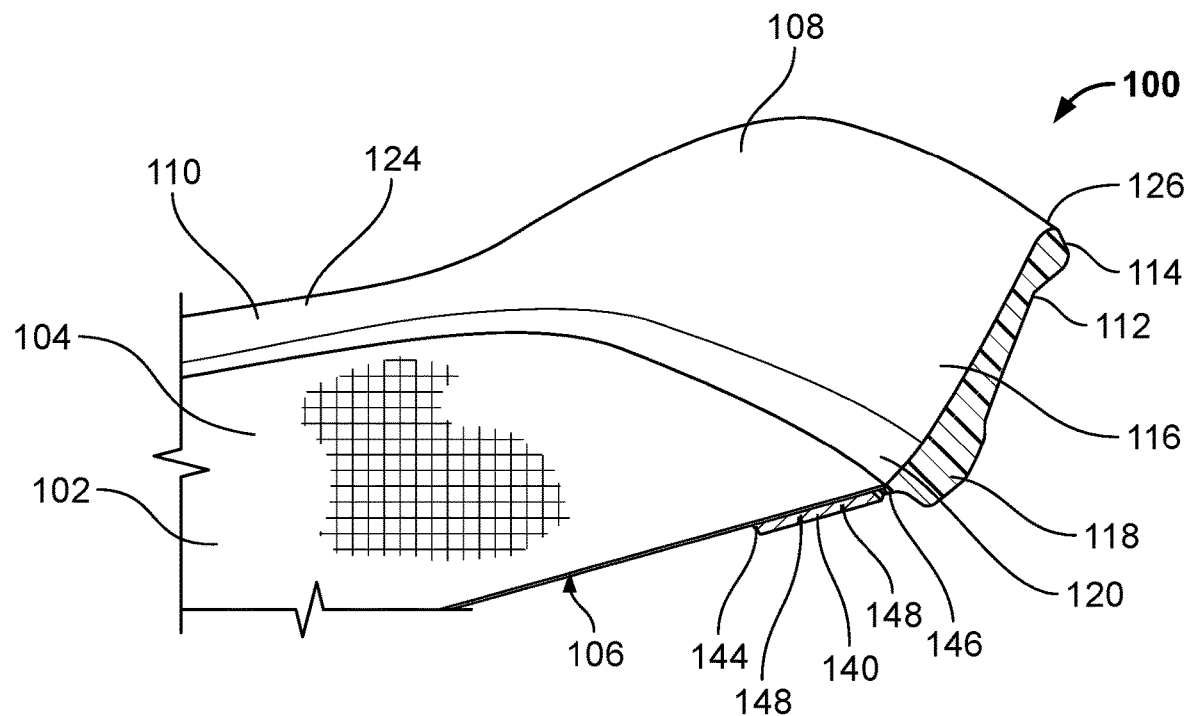
FIG. 3 is a sectional view of a portion of the seat assembly of FIG. 1, taken along the line 3-3 of FIG. 1.
Figure 4:
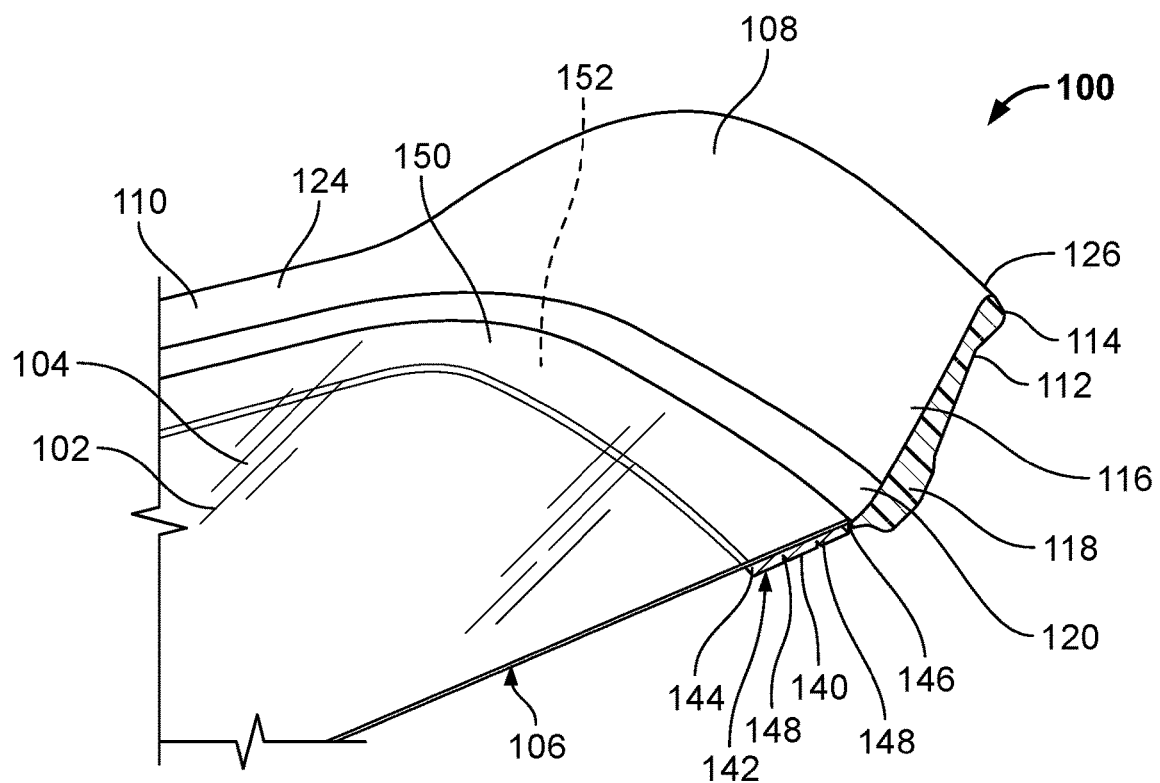
FIG. 4 is a section view of a portion of the seat assembly of FIG. 1, taken along the line 3-3 of FIG. 1 and with a fabric component depicted as being transparent.
Figure 5:
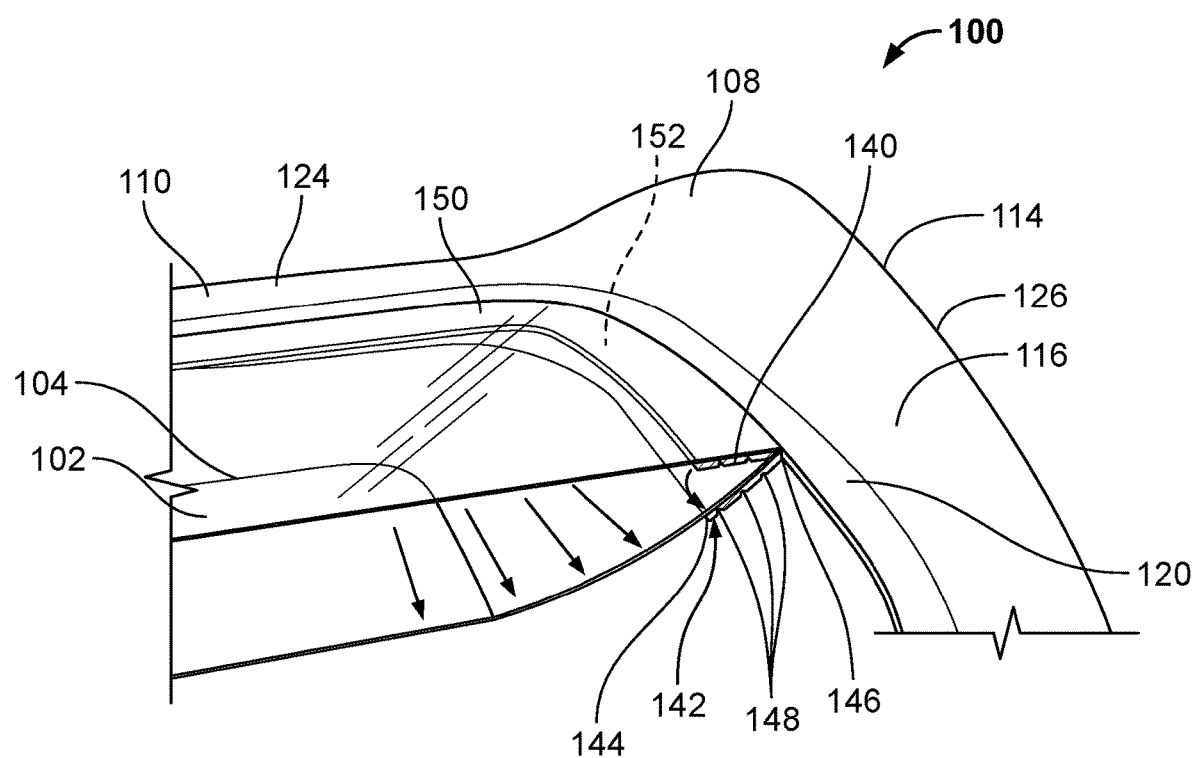
FIG. 5 is a section view of a portion of the seat assembly of FIG. 1, taken along the line 3-3 of FIG. 1 and with the fabric depicted as being transparent and in a loaded state.

As depicted in FIGS. 1-5, the frame 108 varies in thickness and shape as it extends about the fabric component 102. The fabric component 102 is tensioned between the front end 122 and the rear end 124 and, further, between the left end 126 and the right end 128 of the frame 108. Therefore, the fabric component 102 is tensioned and resilient in multiple, opposing directions comprised of equal and opposite force vectors between the fabric component 102 and the frame 108. Accordingly, the fabric component is molded to the inner segment 120 of the frame 108 to provide a suspension force that is configured to support a user when seated on the top surface 104 of the fabric component 102. As depicted in FIGS. 1 and 3-5, the fabric component 102 is substantially horizontal and planar in an unloaded state. Due to the weight of a user when seated on the top surface 104 of the fabric component 102, the fabric component 102 flexes downwardly below the horizontal plane of the longitudinal axis 130, as depicted in FIGS. 2 and 5. In this manner, the fabric component 102 provides a suspension or hammock support for a user seated on the top surface 104.

Referring to FIG. 3, a skirt 140, or suspension member, can be molded to the bottom surface 106 of the fabric component 102. Optionally, the fabric component 102 may be partially embedded or buried within the skirt 140 and the frame 108 (see FIG. 9) due to the molding process. Staying with FIG. 3, the skirt 140 extends from the frame 108 and, more specifically, extends inwardly from the inner segment 120 of the frame 108 relative to central point C. Accordingly, the skirt 140 is partially surrounded by the frame 108, and the fabric component 102 is partially surrounded by the frame 108. In one aspect, the skirt 140 includes a bottom surface 142 that is opposite the fabric component 102 and configured to be exposed or uncovered. Although the skirt 140 and the frame 108 may be integrally formed, the skirt 140 is configured to have a lower modulus of elasticity or elastic modulus than the frame 108.

The elastic modulus of a substance represents the amount of resistance to deformation (e.g., flexure) offered by a substance, and is generally defined as the slope of the stress-strain curve. In the present disclosure, the terms "resistance" and "flexural resistance" are intended to relate to the elastic modulus. Numerous variables impact the magnitude of the elastic modulus, such as material properties, dimensions, force profiles, or rate of deformation, among other factors. Thus, it is possible to increase or decrease the elastic modulus of a substance by manipulating material properties, or by changing the dimensions, such as thickness or width, or by controlling the magnitude and directions of the forces applied, or by changing the time over which a force is applied. In some applications, one or more of these variables will be fixed and other variables will remain variable.

For example, during loading of the seat assembly 100, a user exerts a downward force on the top surface 104 of the fabric component 102, which then distributes that downward force to the frame 108 through areas or portions where the fabric component 102 and the frame 108 interact, such as the skirt 140 and the inner segment 120. Since this downward force could fluctuate and the rate at which the downward force is applied could fluctuate, these are variables for which the skirt 140 and the frame 108 must be designed to accommodate. To do so, the material properties, dimensions, proportions, and force profiles can be modified to provide a desirable performance during loading.

Accordingly, the skirt 140 is configured to provide improved support and stress distribution for the fabric component 102 during loading. When the fabric component 102 flexes downwardly during loading, the skirt 140 is configured to resist the flexure to provide a suspension force that is opposite in direction and equal in magnitude to the force of the weight of a user seated on the top surface 104 of the fabric component 102. As such, the material properties, dimensions, and force profile of the skirt 140 can be tuned or modulated to achieve the desired flexural resistance during loading, thereby imparting the desired resistance, and perceived comfort, to the user seated on the seat assembly 100.

Accordingly, the frame 108 and the skirt 140 may be formed of a material that increases flexural resistance during loading, or that provides greater flexural resistance to loading in applications of low strain, or elongation, or that provides greater flexural resistance to loading in applications of high strain, or a combination thereof. In another aspect, the material properties of the skirt 140 may depend on desired performance during the molding process in which the fabric component 102 is coupled to the skirt 140 at various temperatures, often being at very high temperatures (e.g., temperatures exceeding 400) for certain periods of time. The fabric component 102 may be formed of a material that has a lower melting temperature than the melting temperature of the skirt 140. For example, a resin within the material of the skirt 140 may need to be chemically altered to lower the melt temperature to avoid annealing the fabric component 102 during the molding process. As such, the skirt 140 may be formed of a material composition that strikes a balance between the desired loading performance and flexural resistance properties and the desired temperature and adherence properties for molding to the fabric component 102. Additionally or alternatively, the skirt 140 may be composed of a material that comprises embedded particles, or substrates, or lattices, or rods, or the like.

Further, the skirt 140 dimensions are configured to provide the desired flexural resistance performance. In one aspect, the skirt 140 gradually reduces in thickness in an inward direction relative to the central point C, moving from the inner segment 120 of the frame 108 to an interior edge 144 of the skirt 140. In turn, the flexural resistance of the skirt 140 decreases in an inward direction relative to the central point C. The decrease in flexural stiffness along the skirt 140 may be defined mathematically as a function of a distance from the frame 108, and the mathematical relationship may be linear, e.g., gradual or incremental, or non-linear, e.g., exponential, parabolic, sinusoidal, or logarithmic. For example, the thickness of the skirt 140 at the interior edge 144 may be less than the thickness of the skirt 140 at a point between the interior edge 144 and the inner segment 120. In this manner, the thickness dimension of the skirt 140 is manipulated to provide a lower elastic modulus than the frame 108, thereby achieving a desired flexural resistance. Additionally, the reduced thickness of the skirt 140 may be beneficial to prevent annealing of the fabric component 102 during the molding process (see FIG. 6). Preventing annealing of the fabric component 102 during the molding process may require limiting the heating time or duration experienced by the fabric component 102 and the level of heat exposure to the fabric component 102, such as whether heat is directly applied to the fabric component 102 rather than indirectly.

Still referring to FIG. 3, a living hinge 146 exists between the skirt 140 and the inner segment 120 of the frame 108. The living hinge 146 has a lower flexural resistance than the inner segment 120 of the frame 108, such that the living hinge 146 permits the skirt 140 to rotate about the inner segment 120 during loading. In fact, the frame 108 has an increased flexural resistance in comparison to the skirt 140 and the living hinge 146, such that the interior edge 144 has a lower flexural resistance than the living hinge 146, the inner segment 120, and the mid-segment 116, of the frame 108. In this manner, the flexural resistance of the skirt 140 decreases moving in an inward direction relative to the central point C.

Referring to FIG. 3, the skirt 140 may further include a plurality of grooves 148 extending along the bottom surface 142. The grooves 148 may further influence the distribution of stress by effectively reducing the overall thickness of the skirt 140, which in turn reduces its flexural resistance. More grooves 148 could reduce the flexural resistance of the skirt 140 to provide for more flexure during loading. For example, there may be one, two, or three grooves 148, or even four or five grooves 148, or six or seven grooves 148 disposed along the bottom surface 142 between the living hinge 146 and the interior edge 144.

Additionally or alternatively, the grooves 148 could be sized and shaped to either increase or decrease their impact on the flexural resistance of the skirt 140, such as having a greater depth and width to decrease flexural resistance. Further, the grooves 148 may be positioned at consistent incremental distances from each other along the bottom surface 142, or at varying distances from each other. For example, the grooves 148 may be positioned at a distance ranging from 0.1 mm to 10 mm apart, or 2 mm to 6 mm, or even 4 mm to 5 mm. In another aspect, the living hinge 146 and a first groove may be spaced 5 mm apart, the first groove and a second groove may be spaced 5 mm apart, the second groove and a third groove may be spaced 5 mm apart, and the third groove and the interior edge 144 may be spaced 5 mm apart.

In another example, the plurality of grooves 148 may be positioned closer to the living hinge 146 than to the interior edge 144, or the plurality of grooves 148 may be positioned closer to the interior edge 144 than to the living hinge 146. In still another example, there may be one groove 148 that is equidistant from the living hinge 146 and the interior edge 144. In still another example, there may not be any grooves 148. In yet another example, the grooves 148 may curve or arc along the bottom surface 142 between the interior edge 144 and the living hinge 146. Alternatively, the grooves 148 may include folds or undulations of the skirt 140 in an unloaded state that are configured to unfold or expand in a loaded state. In such an embodiment, the skirt 140 may resemble an accordion unfolding and rotating simultaneously. Still further, the grooves 148 may be slots, or apertures, or recessed portions, or dimples, or the like.

Referring to FIGS. 4 and 5 where the fabric component 102 is depicted as being transparent, a molded periphery 150, or outer contact region, is defined between the skirt 140 and the fabric component 102. The molded periphery 150 has a surface area that is defined by multiplying the dimensions of the skirt 140 that are in contact with the fabric component 102 in an unloaded state, such as, e.g., multiplying a width $W_S$ and length $L_S$ of the skirt 140, where the width $W_S$ is the distance between the living hinge 146 and the interior edge 144 (see FIG. 7) and the length $L_S$ is the distance the skirt 140 extends along the fabric component 102 about the central point C.

In one example, the skirt 140 is molded to only one side of the fabric component 102 and, more specifically, an upper surface 152 of the skirt 140 is molded to the bottom surface 106 of the fabric component 102, as shown in FIGS. 4 and 5. As such, the surface area of the molded periphery 150 is less than the overall surface area of either the top surface 104 or the bottom surface 106 of the fabric component 102, and greater than that of the surface area over which the inner segment 120 contacts the fabric component 102. In another example, the fabric component 102 is partially embedded within the skirt 140 so that the molded periphery 150 is defined along both the top surface 104 and the bottom surface 106 of the fabric component 102. As such, the surface area of the molded periphery 150 is greater than if the fabric component 102 were molded only to a single surface, i.e., the bottom surface 106 or the top surface 104.

Accordingly, the surface area of the molded periphery 150 is configured to define the force profile experienced by the skirt 140, and to distribute the force of the weight of a user to prevent fracture or failure related to loading. If the fabric component 102 were molded only to the inner segment 120 without the skirt 140, the force of the user's weight would be distributed over a much smaller surface area, which would result in higher stresses experienced by the fabric component 102 and the inner segment 120. Further, user comfort is impacted by the force profile and stresses experienced by the fabric component 102 as a result of the surface area of the molded periphery 150. Therefore, a balance must be struck between the surface area of the molded periphery 150 and the amount of stress experienced by the fabric component 102. To do so, several features and designs of the skirt 140, or alternative examples thereof, are described herein.

It is contemplated that the skirt 140 may be irregularly shaped, or may vary in thickness as it extend along the fabric component 102 and about the central point C. Optionally, the skirt 140 may be in continuous contact with the fabric component 102 about the central point C, or an interruption, or a plurality of interruptions, may be disposed between the fabric component 102 and the skirt 140. Further, it is contemplated that the skirt 140 may be in continuous contact along the living hinge 146 with the inner segment 120 of the frame 108. Optionally, the living hinge 146 may include an interruption, or a plurality of interruptions or gaps, therealong, such that the contact between the inner segment 120 and the skirt 140 is discontinuous in some areas, as described herein with respect to FIGS. 7 and 8.

Referring to FIG. 5, the fabric component 102 is illustrated in transition between the unloaded state and the loaded state. The skirt 140 can be seen as rotating about the inner segment 120 of the frame 108 due to the living hinge 146. For example, the interior edge 144 of the skirt 140 is displaced downwardly relative to the horizontal plane of the transverse axis 132 and outwardly relative to the vertical plane of the longitudinal axis 130. Further, the skirt 140 is illustrated as expanding away from the inner segment 120, such that the interior edge 144 moves away from the frame 108 and toward the horizontal plane of the longitudinal axis 130. As the skirt 140 expands, it also contracts in thickness, as according to the well-known Poisson effect. However, as the skirt 140 expands, the grooves 148 or undulations elongate and cause the skirt 140 to increase the distance that the skirt 140 expands outwardly from the inner segment 120, thereby allowing the fabric component 102 to continue flexing downwardly from the horizontal plane of the transverse axis 132. Depending on the number of grooves 148, the variance in thickness along the skirt 140, the material properties of the skirt 140, and other factors, the flexural resistance and resulting comfort of the seat assembly 100 can be tuned or modulated to achieve the desired performance.

Figure 6:
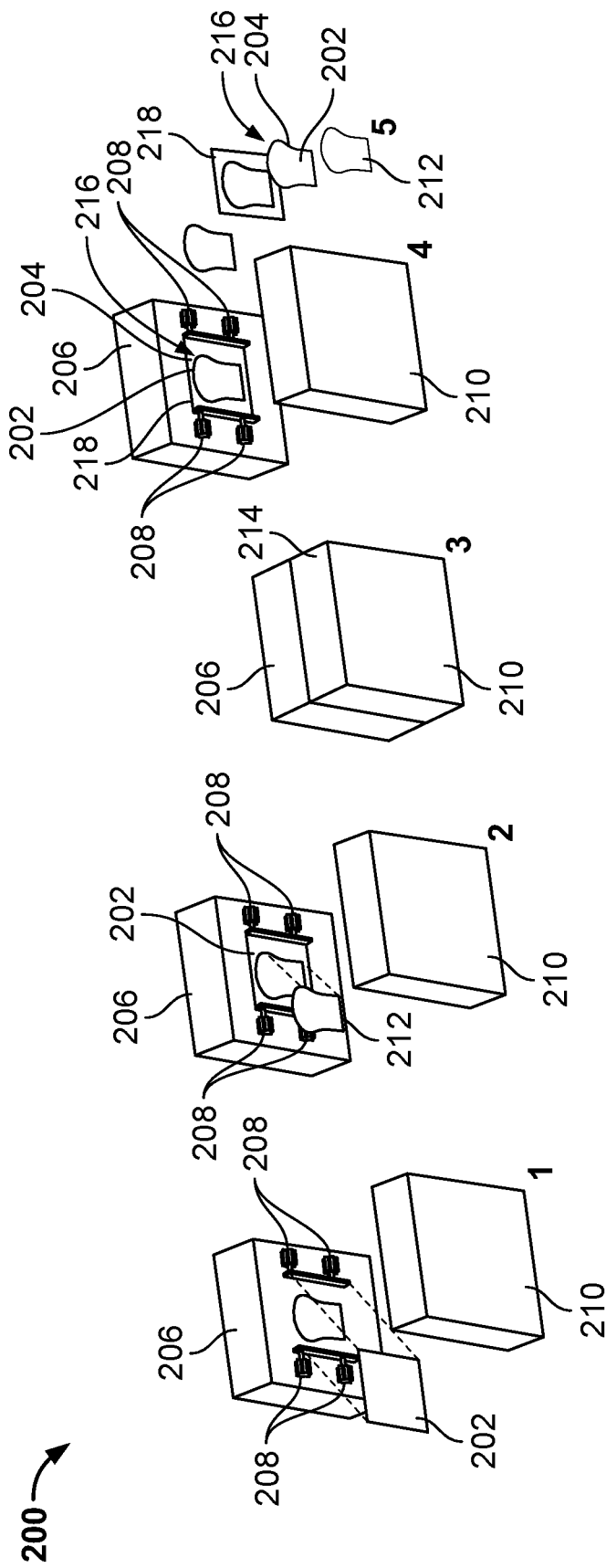
FIG. 6 is a diagram of a simplified example of a molding process for manufacturing a seat assembly.

Referring to FIG. 6, an example of a molding process 200 is disclosed that may be used to attach a fabric blank 202, similar to the fabric component 102, to a frame support 204, similar to the frame 108. It is contemplated that the seat assembly 100 may be manufactured in various ways or steps and by using various machinery or materials, such as those described in U.S. Pat. No. 7,618,572, entitled "Method and Apparatus for Manufacturing Load Bearing Fabric Support Structures," U.S. Pat. No. 7,677,873, entitled "Apparatus and Method for Molding onto a Stretched Blank," U.S. Pat. No. 8,066,501, entitled "Apparatus and Method for Molding onto a Stretched Blank," and U.S. Pat. No. 9,156,211, entitled "Apparatus and Method for Manufacturing a Load Bearing Fabric Surface," all of which are assigned to Illinois Tool Works Inc., and are hereby incorporated by reference in their entirety. It is further contemplated that various alternative methods of manufacturing can be used to manufacture the seat assembly 100, such as types of additive manufacturing or subtractive manufacturing.

As illustrated in FIG. 6, the molding process 200 is depicted in a simplified manner having five stages, moving from left to right on the page, which will be referred to herein as a first, second, third, fourth, and fifth stage. Starting with a first stage of the molding process 200, the fabric blank 202 is received by a first molding block 206 and a tension is applied thereto by a stretching assembly 208. In the first stage, a second molding block 210 is spaced apart from the first molding block 206, such that the mold is open. Next, the second stage involves attaching a heat shield 212 to a side of fabric blank 202 that is exposed to the second molding block 210. The heat shield 212 may be reusable throughout multiple molding processes 200, and as such the heat shield is a polyester film made of PET or biaxially-oriented PET (BoPET), known by the tradename Mylar®, or a similar substance having similar properties.

Then, the third stage involves moving either the first molding block 206 or the second molding block 210 toward one another, thereby forming a molding compress 214, or a closed mold. During the third stage, the frame support 204 is created through injection of a liquid material, such as a thermoplastic material, through a mold cavity designed and arranged to be filled with the liquid material. Further, cooling lines are installed throughout the molding compress 214, either in the first molding block 206 or the second molding block 210 or both. The cooling lines are designed to remove heat from certain areas or portions of the mold at certain times within the molding process 200. For example, cooling lines may be designed to manufacture the integral frame support 204 with thinner and more flexible sections, or thicker and less flexible sections. In addition, the cooling lines may be designed to prevent annealing portions of the fabric blank 202.

Next, the fourth stage of the molding process 200 includes opening the molding compress 214, removing or ejecting a seat assembly 216, which includes the frame support 204 molded to the fabric blank 202, from the stretching assembly 208 of the first molding block 206. At this fourth stage, excess fabric 218 is present in the seat assembly 216 and the heat shield 212 remains secured to the fabric blank 202.

Finally, the fifth stage of the molding process 200 involves removing the excess fabric 218 from the seat assembly 216 and separating the heat shield 212 from the fabric blank 202. The heat shield 212 may then be used in another molding process 200, or it may be shipped as part of the seat assembly 216 to be removed or discarded by an end user. For example, the heat shield 212 may have aesthetic features that make it desirable to include with a shipment of the seat assembly 216 to an end user, such as bearing a company logo, color, phrasing, shape, or other non-functional purpose.

Figure 7:
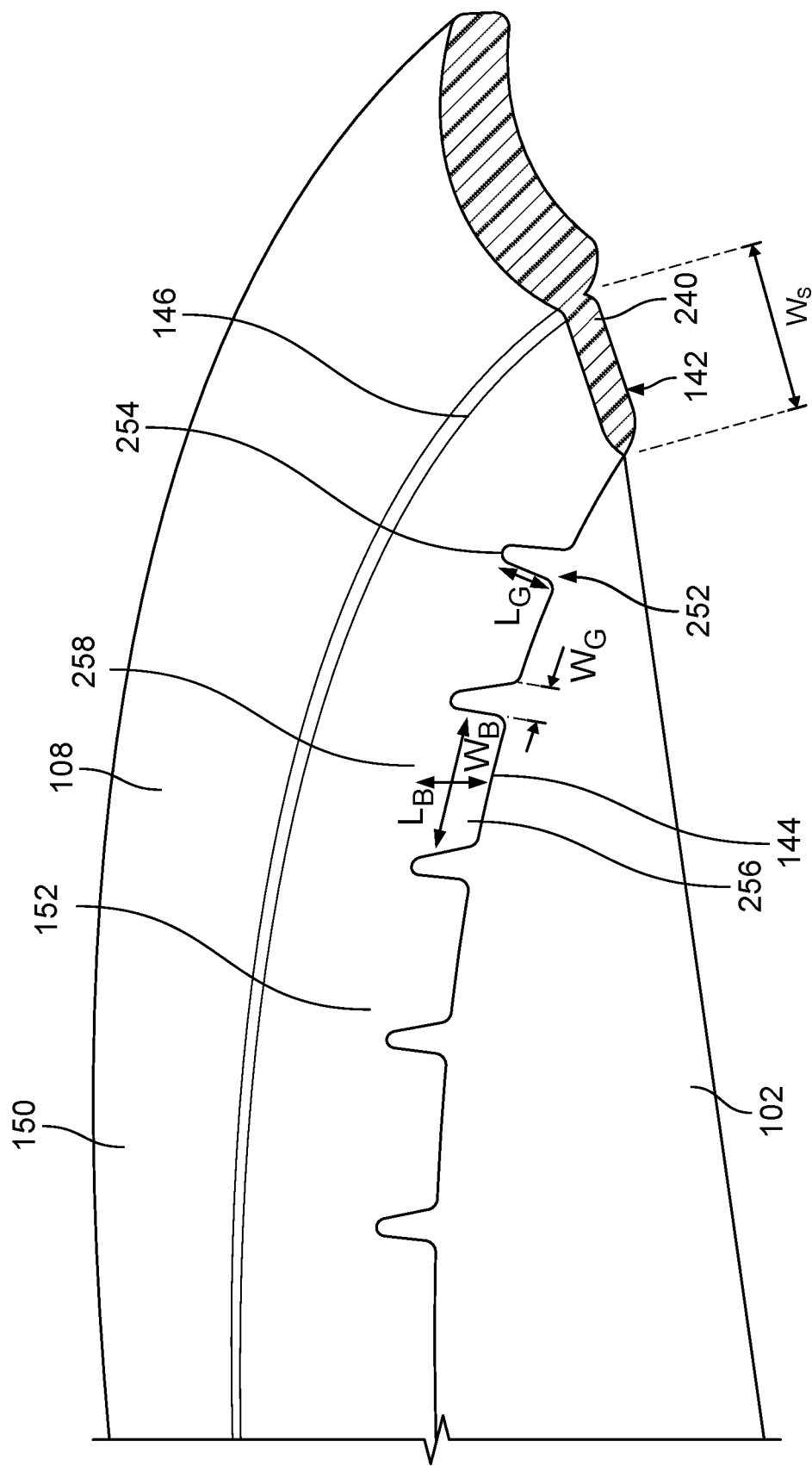
FIG. 7 is a section view of a portion of an embodiment of a seat assembly, similar to the seat assembly of FIG. 1, depicting an alternative embodiment of a skirt.
Figure 8:
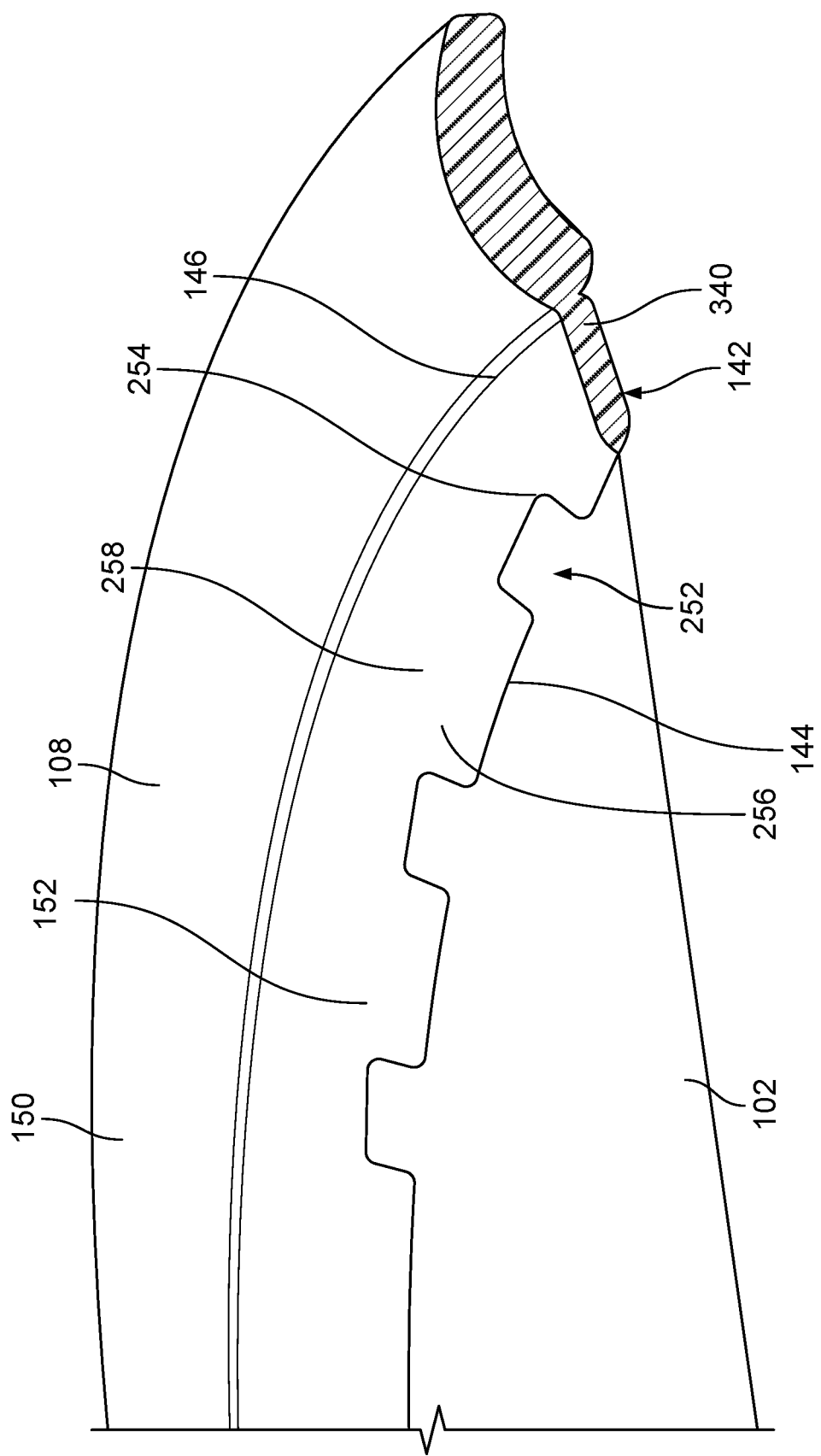
FIG. 8 is a section view of a portion of another embodiment of a seat assembly, similar to the seat assembly of FIG. 7, depicting another alternative embodiment of a skirt.

FIGS. 7 and 8 depict alternative embodiments of a skirt 240 and 340, similar to the skirt 140, such that like reference numerals are used to indicate like elements. In FIGS. 7 and 8, the skirts 240, 340 are depicted with a plurality of gaps 252 formed along the interior edge 144, each gap 252 extending from the interior edge 144 to a gap end 254 that is spaced between the interior edge 144 and the living hinge 146. The plurality of gaps 252 at least partially form a plurality of baffles 256 along the skirt 140, and each baffle 256 may extend from the interior edge 144 to a baffle end 258 that is spaced between the interior edge 144 and the living hinge 146 and also between adjacent gap ends 254. Each gap 252 has a width dimension $W_G$ and a length dimension $L_G$, and each baffle 256 has a width dimension $W_B$ and length dimension $L_B$.

As illustrated in FIG. 7, the width dimension $W_G$ of each gap 252 may narrow from the interior edge 144 to the gap end 254, and the gap end 254 may be curved. However, the width dimension $W_G$ of each gap 252 may be constant between the interior edge 144 and the gap end 254, as depicted in FIG. 8. It is contemplated that the width dimension $W_G$ may be within a range of approximately 4 mm to 60 mm, and each length dimension $L_G$ may be within a range of approximately 4 mm to 130 mm. Further, the width dimension $W_B$ of each baffle 256 may narrow from the interior edge 144 to the baffle end 258, as illustrated in FIG. 7. Alternatively, the width dimension $W_B$ of each baffle 256 may be constant between the interior edge 144 and the baffle end 258, as illustrated in FIG. 8. In addition, the length dimension $L_B$ may be equal to or greater than the length dimension $L_G$ of each gap 252. It is contemplated that the width dimension $W_B$ may be within a range of approximately 4 mm to 260 mm and the length dimension $L_B$ may be within a range of approximately 4 mm to 130 mm.

With reference to FIGS. 7 and 8, the plurality of gaps 252 are illustrated as being of similar size and shape, but it is contemplated that each gap 252 may be differently sized and shaped relative to each other, and also shaped and sized differently than shown in FIGS. 7 and 8. For example, some of the plurality of gaps 252 may have greater width dimensions $W_G$ and length dimension $L_G$ compared to the remainder of the plurality of gaps 252, or the width dimension $W_G$ may narrow in a different direction. In addition, some of the plurality of gaps 252 may have gap ends 254 that are planar or angled rather than, or in addition to, being curved or linear. Similarly, the plurality of baffles 256 are illustrated in FIGS. 7 and 8 as being of similar size and shape, but each baffle 256 may be differently sized and shaped relative to each other. For example, some of the plurality of baffles 256 may have greater width dimensions $W_B$ and length dimension $L_B$ compared to the remainder of the plurality of gaps 252, or the width dimensions $W_B$ may narrow in a different direction. Optionally, the plurality of gaps 252 and the plurality of baffles 256 may form a wave-like pattern, such as, e.g., a sinusoidal or parabolic curve, along at least part of the interior edge 144.

With continued reference to FIGS. 7 and 8, the fabric component 102 extends along an upper surface 260 of the skirt 240, including each baffle 256, and across each gap 252. In this way, the surface area of the molded periphery 150 is reduced as compared to the embodiment of the skirt 140 without the plurality of gaps 252. This reduction in surface area of the molded periphery 150 is configured to change the force profile of the skirt 240 so as to distribute the force of the weight of a user to prevent fracture or failure related to loading while also minimizing any undesirable stiff locations or areas along the molded periphery 150 that could negatively impact the level of comfort experienced by the user. As such, the plurality of gaps 252 and the plurality of baffles 256 are sized, shaped, and arranged to improve user comfort while also minimizing areas of high stress. Further, the skirts 140, 240, and 340 depicted in FIGS. 7 and 8 may be combined with grooves or undulations 148 along the bottom surface 142 as well as a tapered thickness between the living hinge 146 and the interior edge 144.

Figure 9:
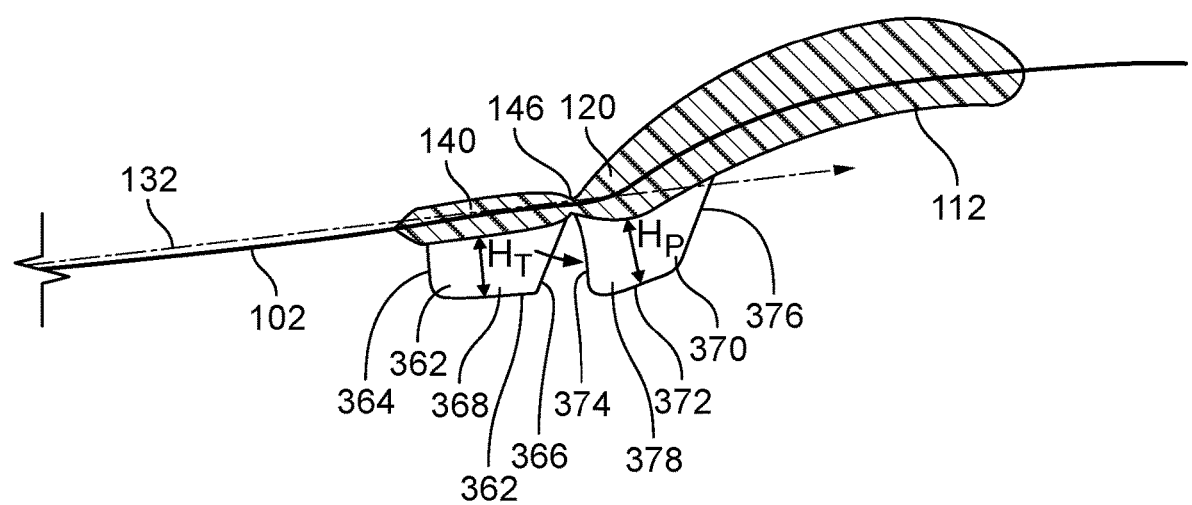
FIG. 9 is a section view of a portion of yet another seat assembly, similar to the seat assembly of FIG. 1, depicting a skirt gusset and a frame gusset.

As depicted in FIG. 9, any of the skirts 140, 240, and 340 may include an undulation in the form of a projection or skirt gusset 360, shaped similar to a rib or a fin, extending downwardly from the bottom surface 142 thereof. The skirt gusset 360 may include a downward facing bottom side 362 that extends between an interior side 364 and an exterior side 366, with the interior side 364 being located nearer to and at least partially facing toward the central point C and the exterior side 366 being farther and at least partially facing away from the central point C. The skirt gusset 360 may extend at least partially along the bottom surface 142 between the living hinge 146 and the interior edge 144. Further, the skirt gusset 360 can define a height dimension $H_T$ between the bottom surface 142 and the bottom side 362 of the skirt gusset 360. In addition, the skirt gusset 360 may have a width dimension $W_T$ (see FIG. 10) defined between opposing walls 368. Optionally, the skirt gusset 360 may extend circumferentially or radially along the bottom surface 142 of the skirts 140, 240, 340 so as not to have opposing walls 368.

Additionally or alternatively, a frame gusset 370, similar to the lower protrusion 118, can be provided on the frame 108, as depicted in FIG. 9. The frame gusset 370 includes a downward facing bottom edge 372 extending between an interior edge 374 being located nearer to and at least partially facing the central point C and an exterior edge 376 being located farther from and at least partially facing away from the central point C. The frame gusset 370 may have a mirrored design as compared to the skirt gusset 360. The frame gusset 370 may extend at least partially along the lower surface 112 within the inner segment 120 and between the living hinge 146 and the mid-segment 116. Further, the frame gusset 370 can define a height dimension $H_P$ between the lower surface 112 and the bottom edge 372 of the frame gusset 370. In addition, the frame gusset 370 may have a width dimension $W_P$ (see FIG. 10) defined between opposing sidewalls 378. Optionally, the frame gusset 370 may extend circumferentially or radially along the lower surface 112 so as not to have opposing sidewalls 378.

Figure 10:
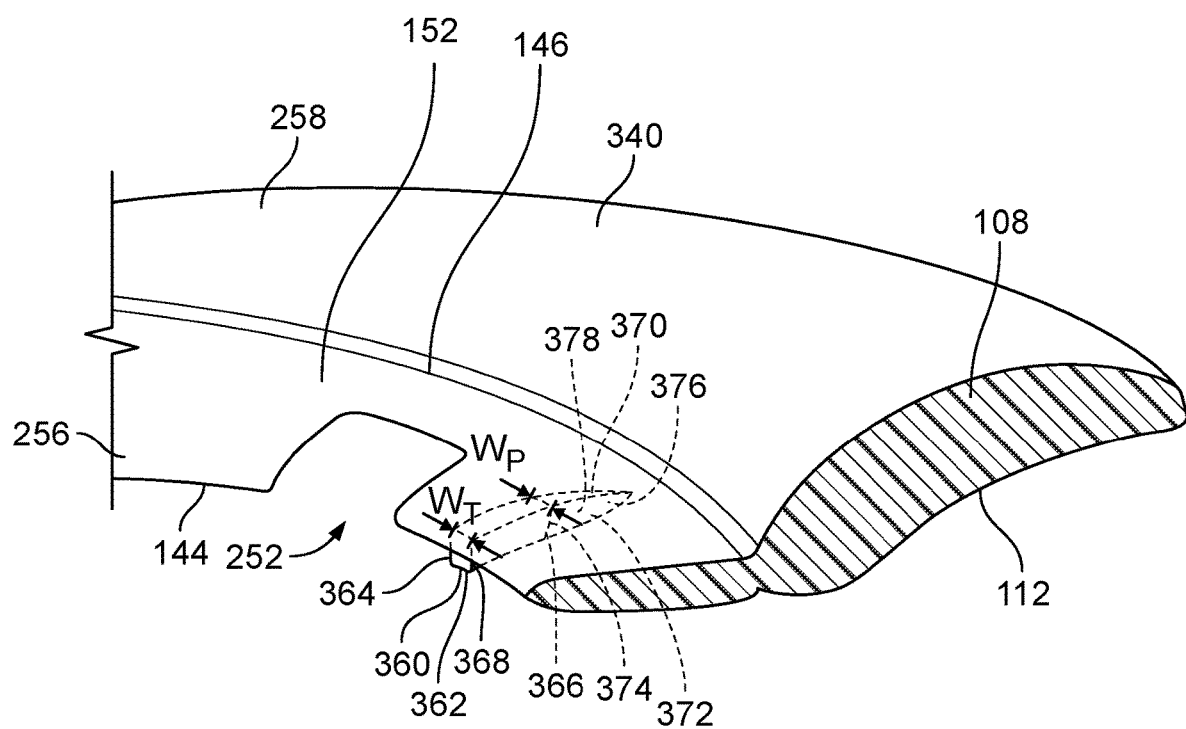
FIG. 10 is a perspective view of a portion of the seat assembly of FIG. 9 in which the skirt gusset and frame gusset are depicted in broken lines, for illustrative purposes, as being visible through a portion of the skirt.

The skirt gusset 360 is preferably configured to mate with the frame gusset 370 of the frame 108 and, more specifically, the exterior side 366 of the skirt gusset 360 is configured to mate with the interior edge 374 of the frame gusset 370, as depicted in FIG. 10. This mating will occur during loading of the fabric component 102, such as, e.g., when a user sits on the fabric component 102 to cause rotation about the living hinge 146 and, thus, rotation of the skirt gusset 360 about the living hinge 146, as indicated in FIG. 9 by the arrow pointing in the direction from the skirt gusset 360 to the frame gusset 370. During such rotation, the exterior side 366 of the skirt gusset 360 moves toward the interior edge 374 of the frame gusset 370 until the two are in contact, as depicted in FIG. 10. In this way, the frame gusset 370 limits movement of the skirt gusset 360 and, thus, movement of the fabric component 102 during loading. This may prevent excessive flexure of the skirt 140, or alternative skirts 240 and 340, as well as excessive flexure of the frame 108, the inner segment 120, and the fabric component 102, thereby preventing failure due to tearing or shearing of such components during loading and increasing the useful life of the seat assembly 100.

In addition, the skirt gusset 360 and the frame gusset 370 may be integrally formed with the frame 108 and/or the skirt 140, 240, 340, so as to be comprised of identical or similar materials as the frame 108 and/or the skirt 140, 240, 340. In this way, when the skirt gusset 360 contacts the frame gusset 370, each can allow for some elastic deformation, acting similar to a spring to provide a soft and controlled resistance to further movement. In this way, each of the skirt gusset 360 and the frame gusset 370 is configured to be compressed in at least one direction and to prevent sharp or abrupt forces from being transmitted to the user seated on the fabric component 102. Moreover, the materials used and particular locations of the skirt gusset 360 and the frame gusset 370 assist in creating a hammock-like suspension of a user seated on the fabric component 102, while also preventing excess wear and tear due to repeated flexure of the components (e.g., skirt, frame, and fabric component) over the useful life of the seat assembly 100.

Further, the exterior side 366 of the skirt gusset 360 may be disposed at an angle relative to the horizontal plane of the transverse axis 132, the angle optionally being with a range of approximately 5° to 175°, and the interior edge 374 of the frame gusset 370 may be disposed at an angle relative to the horizontal plane of the transverse axis 132, the angle optionally being with a range of approximately 5° to 175°. In addition, the exterior side 366 may be curved or angled or otherwise shaped to mate with the interior edge 374 of the frame gusset 370. In this way, the exterior side 366 of the skirt gusset 360 and the interior edge of the frame gusset 370 are each configured to mate together in a cooperative way for promoting hammock-like suspension of a user, soft and controlled resistance to further movement, and prevention of excess wear and tear, especially when combined with the material composition and particular location of each gusset.

Moreover, in some examples a plurality of skirt gussets 360 and a plurality of frame gussets 370 may be provided along the skirt 140, or skirts 240 and 340, and the frame 108, respectively, to evenly distribute the resistance to movement about the seat assembly 100. It is contemplated that the plurality of skirt gussets 360 and the plurality of frame gussets 370 may be arranged to abut each other and, thus, each plurality is provided in identical quantities, such as, e.g., two, or three, or four, or five, or six, or seven, or eight, or nine, or even ten. In some examples, skirt gussets 360 and the frame gussets 370 may be spaced apart from each other, such as, e.g., being in a radially spaced arrangement about the central point C. As such, each of the skirt gussets 360 may be shaped and sized differently from each other. For example, some skirt gussets 360 may have greater or smaller height dimensions $H_T$ or width dimension $W_T$. Further, each of the frame gussets 370 may be sized or shaped differently from each other, such as, e.g., some frame gussets 370 having greater or smaller height dimensions $H_P$ or width dimensions $W_P$ than the remainder of the frame gussets 370. By providing the plurality of skirt gussets 360 and the plurality of frame gussets 370 in such quantities with such dimensions, even more distribution of forces can be achieved to promote hammock-like suspension of a user, soft and controlled resistance to further movement, and prevention of excess wear and tear.

It will be appreciated that the foregoing description of aspects relating to FIG. 5 and the molding process of FIG. 6 are applicable to any of the skirts and/or frame members described herein.

It is contemplated that the seat assembly described herein may be used in a variety of applications, such as in furniture for residential, commercial, entertainment, transportation, or office applications. Alternatively, the described seat assembly may have broader applications, such as in industrial machinery, outdoor sporting equipment, or recreational equipment. For example, the seat assembly described herein can be applied to office furniture, automotive vehicles, airplanes, lawn mowers, watercraft, or even stadium seat, trampolines, or theaters.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the examples disclosed and defined herein extend to all alternative combinations of two or more of the individual features mentioned or evident from the text and/or drawings. All of these different combinations constitute various alternative aspects of the present disclosure. The claims are to be construed to include alternative examples to the extent permitted by the prior art.

The invention claimed is:

1. A seat assembly, comprising:
a fabric component having a seat surface;
a frame including an inner segment directly molded to the fabric component; and
a skirt integrally formed with the frame,
wherein the inner segment extends from a mid-segment that has a greater flexural resistance than the inner segment, and
wherein the skirt is coupled to the inner segment of the frame by a living hinge.

2. The seat assembly of claim 1, wherein the fabric component is at least partially surrounded by the frame.

3. The seat assembly of claim 1, wherein the fabric component is configured to extend across the frame in a tensioned state.

4. The seat assembly of claim 1, wherein the fabric component is at least partially composed of a resin material.

5. The seat assembly of claim 1, wherein the skirt is configured to be molded to the fabric component, the skirt having a lower flexural resistance than the frame.

6. The seat assembly of claim 5, wherein the skirt is at least partially composed of a material having a melting temperature that is greater than a melting temperature of the material of the fabric component.

7. The seat assembly of claim 5, wherein the skirt includes a plurality of gaps therealong.

8. A seat assembly, comprising:
a seat member;
a frame; and
a skirt integrally formed with the frame and the seat member,
wherein an inner segment of the frame has a flexural resistance that is greater than a flexural resistance of the skirt, and
wherein the skirt is coupled to the inner segment of the frame by a living hinge.

9. The seat assembly of claim 8, wherein the skirt extends along at least a portion of a periphery of the seat member.

10. The seat assembly of claim 8, wherein at least a portion of the seat member is configured to rotate about the inner segment of the frame.

11. The seat assembly of claim 8, wherein the flexural resistance of the skirt decreases in a direction moving inwardly from the living hinge to an interior edge of the skirt.

12. The seat assembly of claim 8, wherein the skirt includes a plurality of undulations therealong.

13. The seat assembly of claim 8, wherein the skirt decreases in thickness between an interior edge and the frame.

* * * * *